United States Patent [19]
Wright et al.

[11] 3,870,779
[45] Mar. 11, 1975

[54] PROCESS OF RECOVERING RHENIUM VALUES FROM COMPLEX INDUSTRIAL SOLUTIONS

[75] Inventors: Craig Nellis Wright; Kenneth Julian Richards, both of Salt Lake City, Utah

[73] Assignee: Kennecott Copper Corporation, New York, N.Y.

[22] Filed: Oct. 10, 1973

[21] Appl. No.: 404,921

[52] U.S. Cl.................... 423/50, 75/108, 75/109, 423/52
[51] Int. Cl............................................ C01g 47/00
[58] Field of Search........... 423/49, 50, 52; 75/109, 75/108; 210/42, 49–52

[56] References Cited
OTHER PUBLICATIONS

Lebedev, "The Chemistry of Rhenium," Butterworths, London, 1962, pp. 66–72.

Sims et al., "Investigation of Rhenium," Batlelle Memorial Institute, Columbus, Ohio, 1952, pp. 8–16.

*Primary Examiner*—Herbert T. Carter
*Attorney, Agent, or Firm*—Mallinckrodt & Mallinckrodt

[57] ABSTRACT

Rhenium values are recovered from dilute solutions thereof by introducing a soluble sulfide into the solution and reacting the rhenium values with a base metal in the presence of the sulfide to form a precipitate which may be easily separated from the solution. The rhenium is recovered from the precipitate by conventional procedures.

6 Claims, 1 Drawing Figure

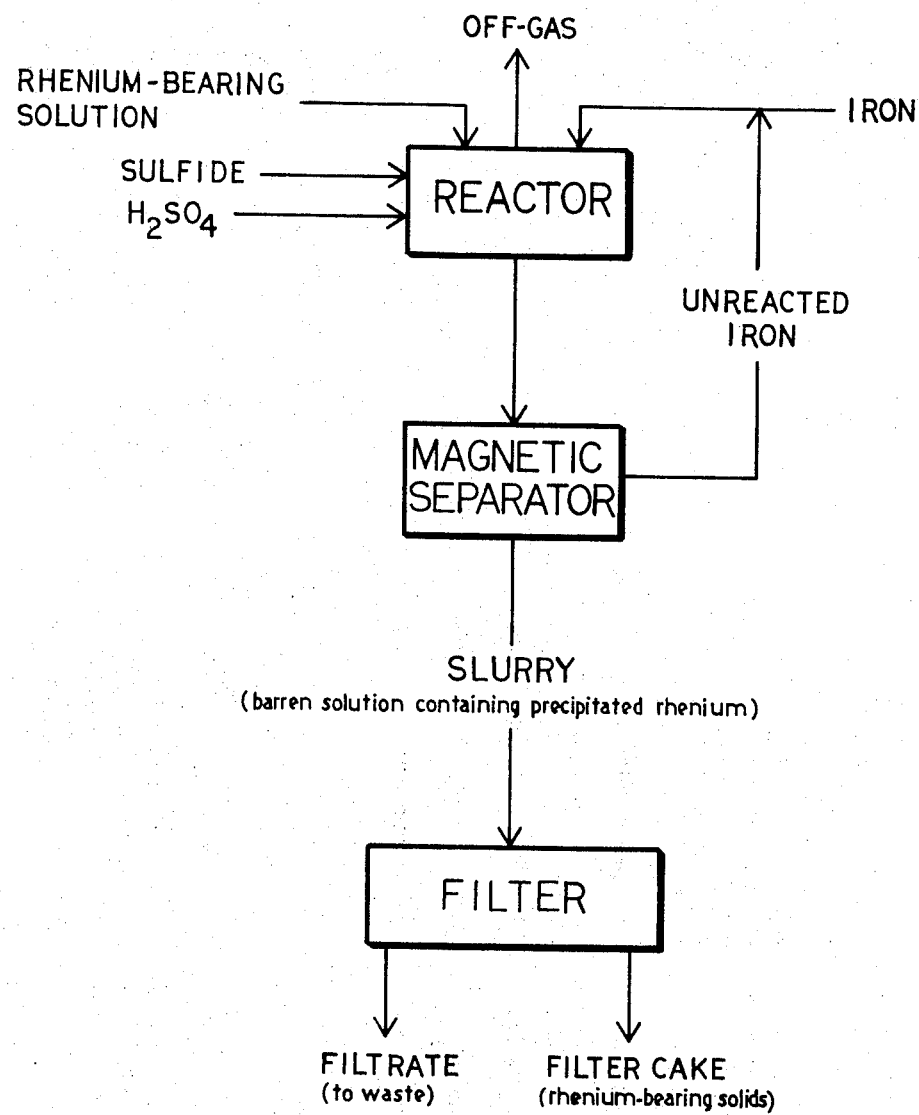

PROCESS OF RECOVERING RHENIUM VALUES FROM COMPLEX INDUSTRIAL SOLUTIONS

BACKGROUND OF THE INVENTION

1. Field

This invention is in the field of rhenium recovery by precipitation from complex, industrial solutions containing same.

2. State of the Art

It is known that rhenium values can be precipitated from rhenium-containing solutions by the addition to such solutions of sulfide ions or by cementation on a base metal, such as iron or zinc. However, when either of these methods is individually carried out on complex, industrial solutions, recovery of rhenium is poor.

SUMMARY OF THE INVENTION

According to the invention, a complex, industrial solution containing rhenium values is treated by the introduction thereinto of a soluble sulfide, and the soluble rhenium values in the solution are reacted with a base metal to form an insoluble precipitate. It has been found that a synergistic effect is obtained by precipitating the rhenium values with a base metal in the presence of a soluble sulfide. The precipitate thus formed may be easily separated from the solution by conventional means, such as by filtering, to obtain essentially total recovery of the rhenium values. If the rhenium is reacted with a base metal without the sulfide being present, the resulting rhenium-containing precipitate is very difficult if not impossible to separate from the residual solution, and at best, only a portion of the rhenium originally present in the solution is recovered. When the solution is treated with a soluble sulfide alone, only a portion of the rhenium values contained therein is precipitated.

THE DRAWINGS

Embodiments representing the best mode presently contemplated of carrying out the present invention are shown in the accompanying drawing in which the single FIGURE is a flow diagram applied to a solution containing dissolved rhenium values.

DETAILED DESCRIPTION OF ILLUSTRATED EMBODIMENTS

As illustrated in the drawing, an aqueous solution containing dissolved rhenium values is introduced into a reactor vessel. The solution may be a residual mother liquor from an ammonium perrhenate crystallizer, a flue gas scrubbing solution, a raffinate from ion exchange or solvent extractions, waste water, or some other complex, industrial solution containing rhenium values.

A typical example of the process of this invention is the recovery of rhenium values from the residual mother liquor obtained following the crystallization of ammonium perrhenate from an ion exchange stripping solution. Ion exchange methods of extracting rhenium from rhenium-bearing solutions are disclosed in U.S. Pat. Nos. 2,876,065; 3,244,475; and 3,558,268.

The rhenium-containing solution is treated in the reactor vessel by introducing thereinto a soluble sulfide. Typical sulfides are $Na_2S$, $NaHS$, and $H_2S$, and concentrated solutions of these can be added directly to the solution or gaseous $H_2S$ can be bubbled through the solution. The amount of sulfide above the minimum is not critical, and from a practical standpoint, is limited only by the solubility of the particular sulfide being used.

Sulfuric acid and a base metal are also added to the mixture in the vessel, and the mixture is agitated for a time sufficient to precipitate rhenium values therefrom. The base metals which can be used include iron, zinc, manganese and nickel, and the drawing illustrates the process wherein iron is used as the base metal. Preferably, the base metals are added to the solution in powdered form.

The temperatures used in the various steps of the process can vary over a substantial range. Preferably the precipitation step is carried out at a temperature within the range of from 60° to 85°C. The pressure is not critical and can be from subatmospheric to superatmospheric. The pH of the solution during the precipitation step can vary between about 0.5 to about 3.5, preferably between 0.5 to 1.0.

The amount of base metal used is at least that amount sufficient to precipitate essentially all of the rhenium content of the solution. Such an amount is easily determined by simple tests on the solution to be processed. An excess of base metal can be used. Usually, the amount of base metal will range from 3 to 150 parts by weight of base metal per part by weight of rhenium in the solution.

As shown in the drawing, the reaction mixture, obtained when using iron as the base metal, is transferred from the reactor to a magnetic separator where any unreacted iron is removed therefrom. The recovered iron is recycled back to the reactor as a portion of the iron used to treat fresh solutions. The reaction mixture containing the precipitated solids, either coming directly from the reactor or from the magnetic separator in those instances where iron is used as the base metal, is forwarded to a filter or other liquid-solids separation equipment wherein the solids containing precipitated rhenium values are separated from the mixture. The filtrate obtained is discarded or used in other processes not encompassed by the present invention. The rhenium containing solids from the filter or other liquid-solids separation device are processed by known hydrometallurgical treatments to recover the rhenium values therefrom. Such treatments include leaching of the solids under mild oxidizing conditions as well as other disclosed in "The Chemistry of Rhenium" by K. B. Lebedev, Butterworths, London (1962) pages 66 to 72.

The process of the present invention provides substantial improvements in yield and recoverability of the rhenium from complex, industrial solutions in comparison to processes wherein sulfide or a base metal are used alone. The increased yield of recovered rhenium results from a synergistic effect obtained when the rhenium values in the solution are precipitated by a base metal in the presence of a soluble sulfide. Treatment of the solution with a soluble sulfide alone results in precipitation of only a portion of the rhenium values contained therein, and the recovery of the rhenium from the solution is poor. When the rhenium values are precipitated with a base metal in the absence of a soluble sulfide, it is very difficult, it not impossible, to separate the small, minute particles of the precipitate from the solution, and the recovery of the rhenium is again poor. The precipitate formed in the process of this invention can be easily and efficiently separated from the solution resulting in a high recovery of the precipitated rhenium values. In fact, the process of the present invention results in essentially total recovery of the precipitated rhenium from the solution.

The following examples will further illustrate the invention:

EXAMPLE I

An aqueous rhenium-bearing solution obtained by scrubbing molybdenite roaster flue gases and containing 0.3 gram rhenium and 1 gram molybdenum per liter of solution was divided into three portions. The first portion was treated by the process of the present invention, and the remaining two portions were treated respectively by prior art processes.

A. Treatment by Process of Invention

The sample of solution was contacted with hydrogen sulfide gas for a time sufficient for a sample to absorb approximately 12 grams of hydrogen sulfide per gram of rhenium in the solution. The temperature and pH of the solution were maintained at 85°C and 0.6 respectively.

Powdered iron was added to the solution in an amount equal to 160 grams of iron per gram of rhenium in the solution, and the mixture was agitated for a period of 2.5 hours. The temperature and pH of the mixture were maintained at 85°C and 0.6 respectively.

The reaction mixture was then filtered, and the resulting filtrate contained 0.005 gram of rhenium per liter solution. The filtered solids contained, on a weight basis. 5.16 percent rhenium, 9.85 percent molybdenum, and 19.6 percent iron. Ninety-eight percent of the rhenium values contained in the initial sample of solution were recovered in the filtered solids.

B. Direct Cementation on Iron (Prior Art)

The sample of solution was divided into several separate portions, and powdered iron was added to the separate portions in amounts varying from 125 to 185 grams of iron per gram of rhenium. The separate portions were heated to temperatures varying between 20°C and 85°C and held at their respective temperatures for a period of 2.5 hours while simultaneously being agitated. The pH of individual portions varied from 0.6 to 1.8.

The soluble rhenium concentration in the resulting mother liquors, irrespective of the amount of iron added or of the temperature or pH of the solutions, was reduced from 0.3 to approximately to 0.02 gram of rhenium per liter, and the particles of precipitated rhenium formed in each of the solutions were of such minute size that only 20 to 40 percent thereof were recovered when the solutions were centrifuged and decanted.

C. Direct Sulfidizing (Prior Art)

The sample of solution was contacted with hydrogen sulfide gas for a time sufficient for the solution to absorb approximately 12 grams of hydrogen sulfide per gram of rhenium in the solution. The temperature of the solution was maintained at 85°C, and the pH of the solution was maintained at 0.6.

A precipitate formed in the solution and was separated therefrom by filtration. The resulting filtrate contained 0.15 gram of rhenium per liter. Thus, only 50 percent of the rhenium values contained in the initial sample were precipitated by the sulfide treatment.

EXAMPLE II

The procedure of Example I was repeated with the exception that the aqueous rhenium-bearing solution was the mother liquor obtained following the crystallization of ammonium perrhenate from an ammonium thiocyanate ion exchange stripping solution. Such crystallizer mother liquors typically contain from 2-7 grams of rhenium, 1-7 grams molybdenum, and 130 to 170 grams of ammonium thiocyanate respectively per liter of solution. The particular mother liquor used in part B of the example contained 7 grams of rhenium per liter, and the mother liquor used in part A and C of the example contained 1.99 grams of rhenium per liter.

A. Treatment by Process of Invention

The sample of solution was contacted with hydrogen sulfide gas for a time sufficient for it to absorb approximately 12 grams of hydrogen sulfide per gram of rhenium therein. The temperature and pH of the solution were maintained at 85°C and 0.6 respectively.

Powdered iron was added to the solution in an amount equal to 126 grams of iron per gram of rhenium in the solution, and the mixture was agitated for a period of 2.5 hours. The temperature and pH of the mixture were maintained at 85°C and 0.6 respectively.

The reaction mixture was then filtered. The filtrate contained 0.016 gram of rhenium per liter in comparison to 1.99 grams of rhenium per liter in the initial sample of solution. The overall recover, of rhenium in the solids obtained by the filtration was equivalent to 96 percent of the rhenium in the initial sample. The filtered solids contained, on a weight basis, 5.9 percent rhenium.

B. Direct Cementation on Iron (Prior Art)

Powdered iron was added to the sample of solution in an amount equivalent to 126 grams of iron per gram of rhenium in the solution. The mixture was agitated for a period of 2.5 hours. The temperature and pH were maintained at 82°C and 0.6 respectively.

The soluble rhenium concentration in the solution was reduced from 7.0 to 0.7 grams per liter; however, the particles of precipitated rhenium were of such minute size that only 70 percent thereof were recovered by filtering the reaction solution.

C. Direct Sulfidizing (Prior Art)

The sample of solution was contacted with hydrogen sulfide gas for a time sufficient for it to absorb approximately 12 grams of hydrogen sulfide per gram of rhenium therein. The temperature and pH of the solution were maintained at 85°C and 0.6 respectively.

A precipitate formed in the solution and was separated therefrom by filtration. The soluble rhenium concentration in the mother liquor was reduced from 1.99 to 0.42 grams rhenium per liter of solution. Approximately 80 percent of the rhenium precipitated from the solution was recovered in the solids obtained by filtering the solution.

What we claim is:

1. A process of recovering rhenium values from dilute solutions thereof, comprising introducing a soluble sulfide into the solution in an amount of at least about 2 molecules sulfide per molecule of rhenium in the solution; introducing a base metal selected from the group consisting of iron, zinc, nickel, and manganese into the solution in an amount sufficient to precipitate soluble rhenium values therein as an insoluble species while maintaining the pH of the solution between about 0.5 and about 3.5; separating the precipitate from the solution; and recovering the rhenium from the precipitate.

2. A method as claimed in claim 1 wherein the pH is maintained by addition of solution acid thereto.

3. A method as claimed in claim 1 wherein the dilute solution of rhenium to be treated contains from 0.1 to 10 grams per liter of rhenium.

4. A method as claimed in claim 1 wherein the soluble sulfide is a sulfur compound selected from the group consisting of $H_2S$, $Na_2S$, and NaHS.

5. A method as claimed in claim 4 wherein the sulfur compound is $H_2S$ or NaHS

6. A method as claimed in claim 5 wherein the base metal is iron.

* * * * *